United States Patent
Mueckenheim et al.

(10) Patent No.: US 6,704,291 B2
(45) Date of Patent: Mar. 9, 2004

(54) RADIO RESOURCE ALLOCATION METHODS AND APPARATUS

(75) Inventors: Jens Mueckenheim, Nuremberg (DE); Jie Lin, Swindon (GB); Qiang Cao, Abbey Meads (GB); Michael Soellner, Erlangen (DE)

(73) Assignee: Lucent Technologies Inc., Murray Hill, NJ (US)

( * ) Notice: Subject to any disclaimer, the term of this patent is extended or adjusted under 35 U.S.C. 154(b) by 309 days.

(21) Appl. No.: 09/760,582

(22) Filed: Jan. 16, 2001

(65) Prior Publication Data

US 2001/0019543 A1 Sep. 6, 2001

(30) Foreign Application Priority Data

Jan. 19, 2000 (EP) .............................................. 00300362

(51) Int. Cl.[7] .......................... H04B 7/216; H04L 12/26
(52) U.S. Cl. ........................ 370/252; 370/335; 370/342
(58) Field of Search ................................. 370/252, 329, 370/331, 332, 335, 336, 341, 342, 395.43, 395.21, 465, 468

(56) References Cited

U.S. PATENT DOCUMENTS

| | | | |
|---|---|---|---|
| 5,914,950 A | | 6/1999 | Tiedemann, Jr. et al. ... 370/348 |
| 5,982,748 A | * | 11/1999 | Yin et al. ..................... 370/232 |
| 6,069,883 A | * | 5/2000 | Ejzak et al. .................. 370/335 |
| 6,181,684 B1 | * | 1/2001 | Turcotte et al. .............. 370/332 |
| 6,201,966 B1 | * | 3/2001 | Rinne et al. ................. 455/434 |
| 6,330,456 B1 | * | 12/2001 | Hashem et al. .............. 455/522 |
| 6,374,112 B1 | * | 4/2002 | Widegren et al. ........... 455/452 |
| 6,421,335 B1 | * | 7/2002 | Kilkki et al. ................ 370/342 |
| 6,469,993 B1 | * | 10/2002 | Seo et al. ..................... 370/329 |
| 6,519,462 B1 | * | 2/2003 | Lu et al. ...................... 455/453 |

OTHER PUBLICATIONS

Jung–Shyr Wu, et al "Performance Analysis of Voice/Data Integrated CDMA System with QoS Constraints" IEICE Transactions on Communications vol. 3 E79–B No. 3, Mar. 3, 1996 pp. 384–391.

C. Oliveira, et al "Quality–of–Service Guarantee in High–Speed Multimedia Wireless Networks""IEEE International Conference On Communications 1996" pp. 728–734.

European Search Report, dated Jun. 30, 2000.

* cited by examiner

Primary Examiner—Chau Nguyen
Assistant Examiner—Soon-Dong Hyun

(57) ABSTRACT

A radio resource method and apparatus involves allocating transmission channels to and from a node (26) based on the system load requirement.

The load requirement is determined from the quality of service requirement which, in turn, is assessed from the data rate, the bit energy to noise power ratio and the signal classification produced by a converter and sorter (38) in response to signal transmission requests. A maximum load generator (40) delivers the maximum load from these parameters. A core calculator and assignor (42) performs a predetermined algorithm on the outputs of the converter and sorter (38) and the maximum load generator (40) and in response thereto controls a channel selector (30) which selects the channels to and from node (26).

8 Claims, 3 Drawing Sheets

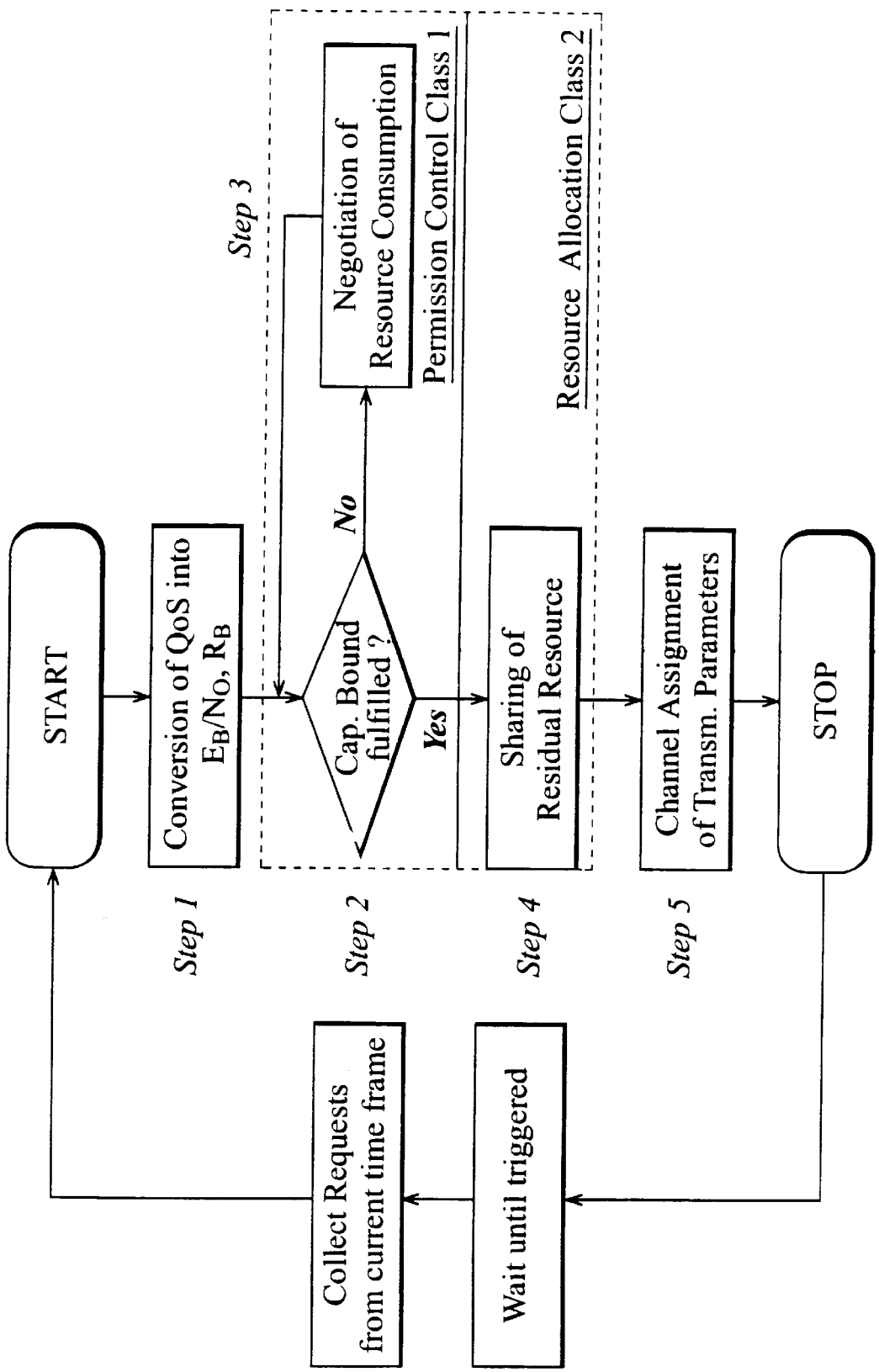

RADIO RESOURCE ALLOCATION METHODS AND APPARATUS

CROSS-REFERENCE TO RELATED APPLICATION

This application claims priority of European Patent Application No. 00300362.1, which was filed on Jan. 19, 2000.

BACKGROUND OF THE INVENTION

1. Field of Invention

The present invention relates to radio resource allocation methods and apparatus.

2. Description of the Related Art

With the advent with another generation of wireless networks known as Universal Mobile Telephone Systems (UMTS) based on wide band code-division multiple access (W/CDMA) techniques, the allocation of radio resources needs to be structured to cope with both the dynamically changing quality of service (QoS) and with the different classes of service (eg real time and non-real time) in a more efficient way.

In a mobile telephone system, communication is effected through a series of nodes eg base stations. Each node receives data from several sources eg mobile phone and needs to transmit that data onwards. The radio resource capacity for each node is limited by such factors as the available transmission power and code sequences. As a result, there will sometimes be more requests for transmission of data through a node than its available capacity. While each request to the node to transmit data will have a minimum quality of service requirement, the quality of service required will vary with time during any particular transmission due to such factors as the speed of a mobile telephone through an environment and internal or external interference.

Requests to transmit data between a mobile phone and a base station are sent over a dedicated control channel (DCCH) while the actual data to be transmitted is sent over a dedicated traffic channel (DTCH).

It is an object of the present invention to provide an improved radio resource allocation method and apparatus.

SUMMARY OF THE INVENTION

According to the present invention there is provided a radio resource allocation method for allocating radio resources for transmission of signals along one or more channels between two nodes comprising the step of monitoring the different requests for transmission of signals between said nodes, dividing the requests into two classes, a first class for real time requirements and a second class for non-real time requirements, extracting from each request a first parameter representing the data rate ($R_b$) requirement and a second parameter representing the bit energy to noise ratio ($E_b/N_o$) requirement prioritising the requests in order based on a predetermined set of rules, and allocating available channels to meet the request in order of priority.

According to the present invention there is further provided radio resource allocation apparatus for allocating radio resources for transmission of signals along a plurality of channels to and from a node, the node comprising a transmitter/receiver for transmitting and receiving signals to and from the node and a channel selection device for selecting the channels along which different signal transmissions are to be routed, and a channel allocation device for controlling the allocation of channels by the channel selection device, the channel allocation device comprising first means responsive to incoming signal transmissions passing through the node to produce a data rate signal, a bit energy to noise power ratio signal and a classification signal, second means responsive to the output of the first means to generate a maximum load parameter signal and third means responsive to an output from the channel selection device providing channel status indications and to the output of the first and second means to process the received signals in accordance with a predetermined algorithm and to feed the channel selection device with channel selection signals accordingly.

BRIEF DESCRIPTION OF DRAWINGS

A radio resource allocation method and apparatus will now be described, by way of example, with reference to the accompanying diagrammatic drawings, in which:

FIG. 4 is a flow chart of the radio resource allocation algorithm; and

DETAILED DESCRIPTION

There are two main Classes of users, which need to be considered:

Class 1: This Class contains all users, which need an immediate serving of their requests (real time users). They are characterised by relatively fixed data rates, which can only be changed within a limited range. The lower limit of data rate is determined by the minimum acceptable service quality. Examples are voice and video transmissions.

Class 2: Users are grouped into Class 2 if they do not need a prompt serving of their requests (non-real time users). They merely require a fixed amount of data to be transmitted in a minimum time. These users can vary their data rates over a wide range right down to data rate zero according to the available capacity (best effort type users). An example is file-transfer.

Resource consumption ($\alpha$) is determined by the request level of quality of service (QoS). The quality of service (QoS) for a certain service i is a function of $E_b/N_o(i)$ (ratio of the energy per information bit to the effective noise power spectral density) and the data rate $R_b(i)$. Resources of W/CDMA are eg the power and the channelisation codes. The use of the channelisation/scrambling codes causes some differences in up-and downlink communications between a node and a mobile station.

Uplink Direction: In the uplink direction one mobile station gets one scrambling code (eg extended set of Kasami). For the multiplexing there are channelisation codes (OVSF—orthogonal with variable spreading factor). The resource consumption $\alpha$ in the uplink direction is therefore function of the QoS only:

$$\alpha(i, \text{uplink})=\text{function}(E_b/N)(i),R_b(i))[\%] \qquad \text{equation 1}$$

Downlink Direction: In the downlink direction each node or base station gets one or more scrambling codes (eg Gold). The different mobiles in the cell are addressed via the channelisation codes (OVSF, the same as in the uplink). Although the code sequence are orthogonal when they are transmitted from a node or base station there is a loss of orthongonality between the codes when received at the mobile station eg due to multipath. The resource consumption in the downlink is a thus function of both QoS and the environment:

$$\alpha(i, \text{downlink}) = \text{function}(E_b/N_o(i), R_b(i), K(i))[\%] \quad \text{equation 2}$$

The factor $K(i)$ is a function of the environment, eg the interference at the mobile station and the above mentioned loss of orthogonality.

Figure 1:
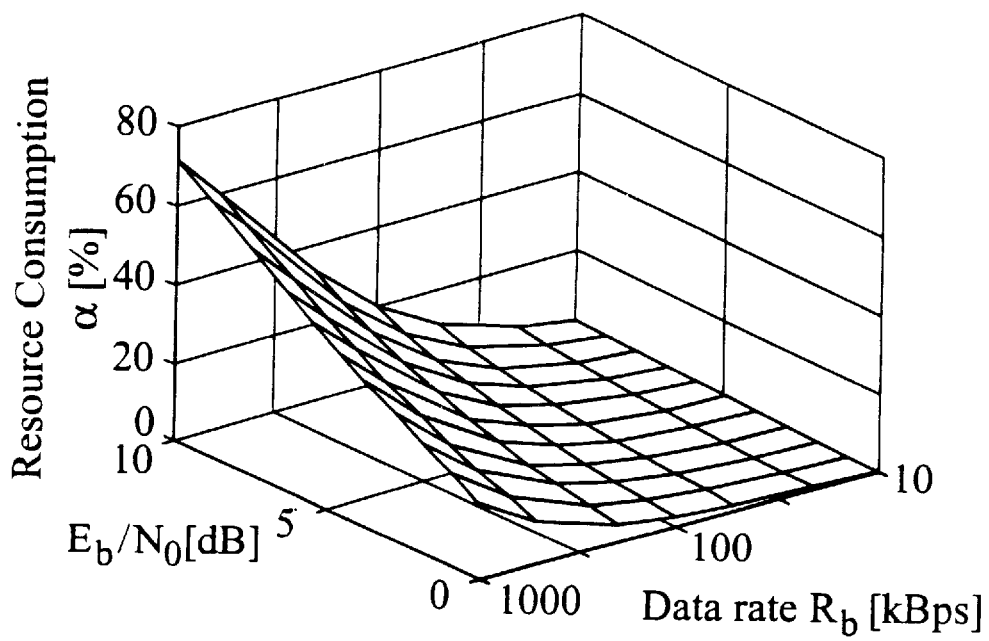
FIG. 1 is a graph showing the relationship between resource consumption and quality of service as defined by data rate and the ratio of bit energy to noise power.

FIG. 1 shows an example of the mapping function between data rate $R_b$, the bit energy to noise power ratio $E_b/N_o$ and the resource consumption $\alpha$ for one service in the uplink (downlink looks similar). The advantage of the present resource consumption concept is that the used coding, interleaving and rate matching principle, influences only the ratio $E_b/N_o$, the data rate $R_b$ is independent of it. The radio $E_b/N_o$ for a certain Radio Access Bearer (RAB) service has to be taken in such a way that the QoS requirements (Bit Error Rate (BER), delay etc) for that RAB service are fulfilled in the current radio environment. For the choice of data rate $R_b$ there are two possibilities:

$R_b = R_{bmax}$: worst case scenario, where $R_{bmax}$ is the maximum bit rate $R_b = R_{bmean} \leq R_{bmax}$: average scenario taking into consideration the statistical multiplexing gain of Code Division Multiple Access (CDMA)—when $R_{bmean}$ is the average or mean bit rate.

There are two methods of determining the current load $\alpha$ of one cell in the system. The first uses the stored values of resource consumption of all services in the network. The second method is based on measurements of physical transmission parameters that must be performed in the mode or base station. The two methods are as follows:

Load Method 1: The current load $\alpha_{current}$ of the cell is given by the sum of the resource consumption of all services that are serviced by the cell, ie $$\alpha_{current} = \sum_{i \in cell} \alpha(i) \quad \text{equation 3}$$

For method 1 the resource consumption of all services that are served in a cell must be stored in the network.

Load Method 2: The current load $\alpha_{current}$ of the cell is given by measurement of physical transmission parameters. The following example describes two different measurements in the uplink and the downlink, respectively. In the uplink the current load can be defined by $$\alpha_{current}(\text{uplink}) = \text{function}(TRP) \quad \text{equation 4}$$

where TRP is the total received power at the base station [in dB]. In the downlink the current load can be defined by $$\alpha_{current}(\text{uplink}) = \text{function}(TTP) \quad \text{equation 5}$$

where TTP is the total transmitted power of the base station [in dB].

Figure 2:
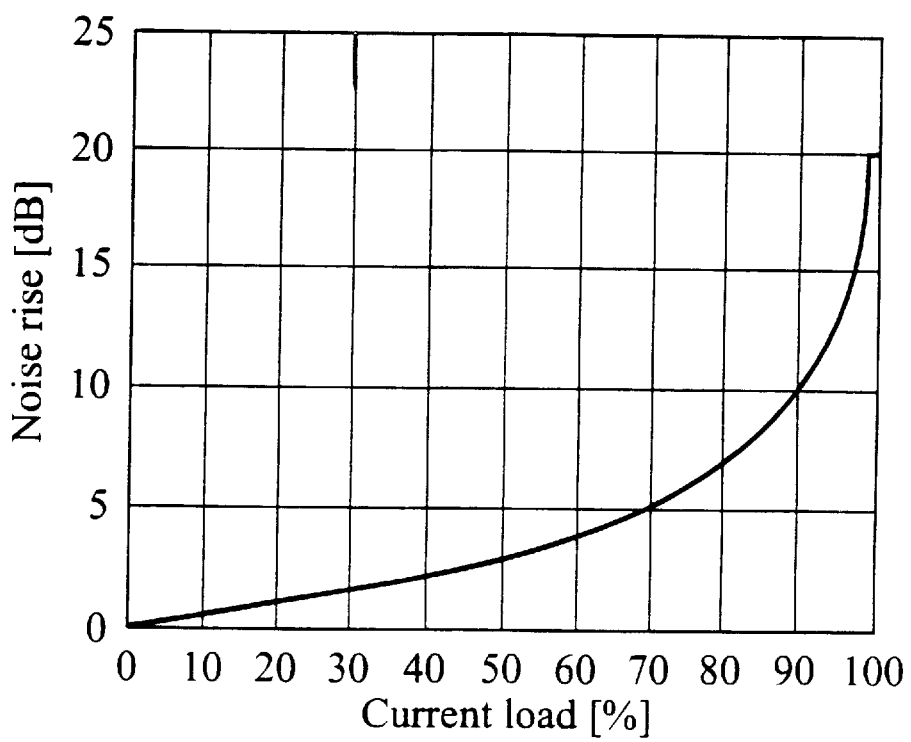
FIG. 2 is a graph showing the relationship between the rise in noise with the rise in current load.
Figure 3:
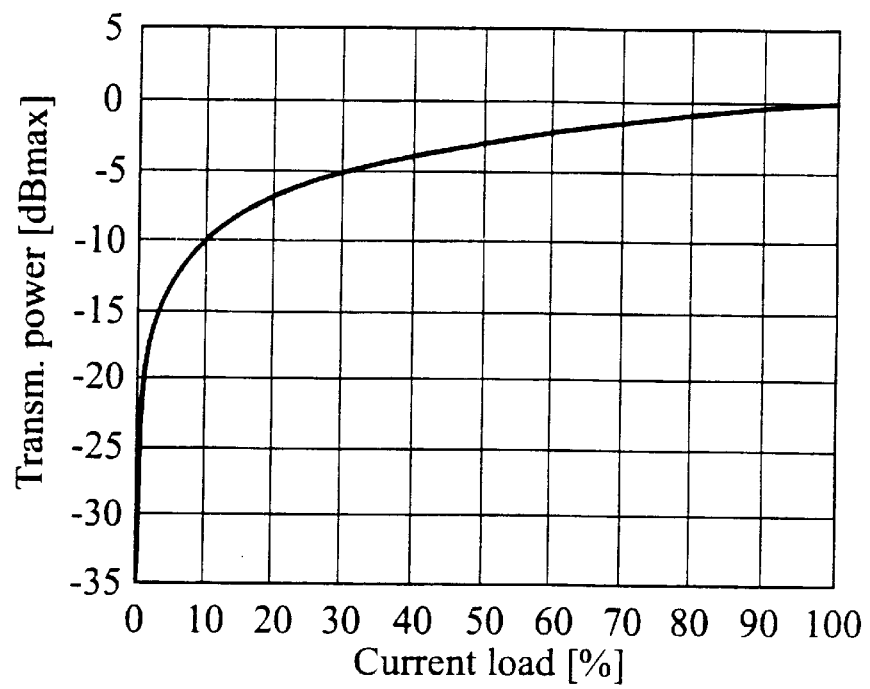
FIG. 3 is a graph showing the relationship between transmission power and current load.

FIGS. 2 and 3 illustrate examples of the functions for the load in the uplink and in the downlink. By method 2 the storage of the resource consumption of all services that are served in the cell is not necessary.

The Radio Resource Allocation Algorithm of the present invention is based on the following capacity equation:

$$\alpha_{current} + \alpha_{new} \leq \alpha_{max} = 100\% - \eta \quad \text{equation 6}$$

ie the overall load of the system should be kept below a maximum value. The safety factor $\eta$ includes an allowance for such factors as includes the intercell interference from at least one neighbour cell, limitations in the transmission power and a reservation of capacity for common channels. Different maximum load values $\alpha_{max}$ can be adjusted for different cells.

FIG. 4 is block diagram of the RRA algorithm. RRA is mainly triggered by two events:

On request from the core network. The following procedures are related to this trigger (non exclusive): RRC connection establishment, Radio Access Bearer (RAB) establishment, Radio Access Bearer (RAB) reconfiguration, etc.

On changes within the radio access network. The following events are related to this trigger (non exclusive): changes of user traffic parameters (eg traffic volume), changes of transmission quality (eg handover) and changes of the current load. The first two cases are used for optimising the overall network capacity. The latter case is used for two reasons:

If the current load decreases, more resources can be allocated to the Class 2 users.

If the current load increases, it must be checked whether the cell load becomes too high (overload protection).

Before the algorithm starts, all subsequent requests of the current time frame will be collected. It will be started at the beginning of the next following time frame. The algorithm is processed for all requests at the same time. The principle is the same for up-and downlink. The steps are as follows:

Step 1: The algorithm starts with Conversion of the QoS from the new requests (i) into data rate $R_b(i)$ and $E_b/N_o(i)$. The QoS may be described by (non exclusive) bit-error ratio, delay data rate, etc. There are two possibilities to perform conversion:

There are service specific fixed $E_b/N_o$ and $R_b$. The values of $E_b/N_o$ and $R_b$ are stored into an allocation table. This method is simple but not very flexible.

There is a dynamically assigned of $E_b/N_o$ and $R_b$ regarding the service behaviour, the used methods of eg error coding, interleaving, rate matching and the physical environment, eg speed of the mobile, interference situation, path loss. This method is more difficult than the previous one but allows a lot of flexibility.

Dependent on the request, the services will be sorted into Class 1 or Class 2. More than one service request for one user can be handled. The resource consumption $\alpha(i)$ of the new requests of Class 1 is determined (of equations 1 or 2). The current load $\alpha_{current}$ of the system is either taken by Load Method 1 or by Load Method 2. From this the current load $\alpha_{current}$ (Class 1) of the Class 1 services is determined by $\alpha_{current}$ (Class 1) $=\alpha_{current}-\alpha$(Class 2). The resource consumption $\alpha_{current}$ (Class 2) of all Class 2 services that are recently served in the cell, are taken from the memory. Now the resource consumption $\alpha_{new}$ of the new requests is taken by $$\alpha_{new} = \sum \alpha(i, new).$$

Step 2: At first, the services of Class 1 will be handled by Permission Control. The maximum load for Class 1 services is given by $\alpha_{max}$ (Class 1)=$\alpha_{max}-\alpha_{reserved}$ (Class 2), where $\alpha_{max}$ is the overall allowed maximum load. Some resource for Class 2 services might be reserved by $\alpha_{reserved}$ (Class 2). The check against the capacity is conducted is as follows:

If $\alpha_{current}$ (Class 1)+$\alpha_{new} \leq \alpha_{max}$ (Class 1), then all requests for Class 1 services can be granted. The Resource Allocation (Step 4) then follows.

If $\alpha_{current}$ (Class 1)+$\alpha_{new} > \alpha_{max}$ (Class 1), then not all requests for Class 1 services can be granted. The Negotiation procedure has to be performed (Step 3).

Step 3: Task of the negotiation procedure is the handling of the situation when not all Class 1 services can be admitted. To decrease the load the resource consumption of some services has to be lowered. There are the following possibilities Decrease the data rate of a new request. If the data rate has to be lowered below the minimum required rate, the new request must be blocked. The new resource consumption is decrease by the negotiated value, ie $\alpha_{new} = \alpha_{new} - \alpha_{negotiated}$.

Decrease the date rate of all currently established services. If the data rate has to be lowered below the minimum required rate, the established services must be dropped. The current load is decreased by the negotiated value, ie $\alpha_{current}$ (Class 1)=$\alpha_{current}$ (Class1)-$\alpha_{negotiated}$. Normally a combination of the two methods is applied. The selection of the requests/services to be negotiated is done on the basis of a priority scheme. It will be proceeded with Step 2 but now with the negotiated values of $\alpha_{current}$ (Class1) and $\alpha_{new}$. This scheme must be proceeded until the requirement $\alpha_{current}$ (Class1)+$\alpha_{new} < \alpha_{max}$ (Class1) is satisfied.

Step 4: The residual capacity is given by $\alpha_{residual} \leq \alpha_{max} - \alpha_{current}$ (Class1)-$\alpha_{new}$. If there is residual capacity $\alpha_{residual}$ available it will be shared between the services of Class 2 via Resource Allocation. If the residual capacity is below a certain threshold $\alpha_{residual} < \alpha_{min}$, there is not enough capacity for the Class 2 services. Then, Step 4 is omitted. The following schemes for sharing the capacity are applicable (non exclusive):

Allocate the data rates $R_b(i)$ (and $\alpha(i)$) regarding the traffic volume of the users ie the user, which has the highest amount of data to transmit gets the highest data rate.

Allocate the data rates $R_b(i)$ (and $\alpha(i)$) regarding the queuing time of users ie the user, which has the longest time to stay gets the highest data rate.

Step 5: The algorithm ends with the Channel Assignment of the transmission parameters. They are determined from $R_b(i)$ and $E_b/N_o(i)$ of the granted services subject to the current transmission conditions. The following parameters can be assigned (non exclusive):

The traffic volume of the service (dynamic part of TFCS)

Type of channel coding, interleaving and rate matching (semistatic part of TFCS)

The type of ARQ and the number of retransmission attempts (RLC Control Info)

Channelisation/Scrambling code (DPCH-Info)

Initial transmission power, $E_b/N_o$-targets, power offsets (Power Control Info)

The assignment parameters are transmitted to the mobile station via higher layer signalling messages. At the end an update of the current resource consumption $\alpha_{current}$ (Class 2)=$\Sigma\alpha$(i, class2) will be done. If Load Method 1 is applied for the load estimate also the new load $\alpha_{current} = \alpha_{current}$ (Class 1)+$\alpha_{new}+\alpha_{current}$ (Class 2) will be stored.

After the end of RRA algorithm it will be waited until the next trigger. Thus RRA will not take place during every time frame, but only on request.

It will be appreciated that the described RRA algorithm has the following features:

It uses the resource consumption and capacity bound (eg mathematial description).

It divides the user into two Classes: real time and non-real time and shares residual resources between non-real time user.

It applies a negotiation loop for real time users.

It collects the requests and converts the QoS of each request into $E_b/N_o$ ratio and data rate $R_b$, it divides the service into two Classes, it provides permission control for Class 1, resource allocation for Class 2 and channel assignment for all granted services.

It can be used for the uplink as well as for the downlink.

It handles more than one service by one user simultaneously. Service mix between Class 1 and Class 2 for one user is possible.

It provides overload protection.

It supports different methods for determining the current load in the system, ie the use of the stored values of the resource consumption as declared in method 1 or the use of measured physical transmission parameters as declared in method 2.

Figure 5:
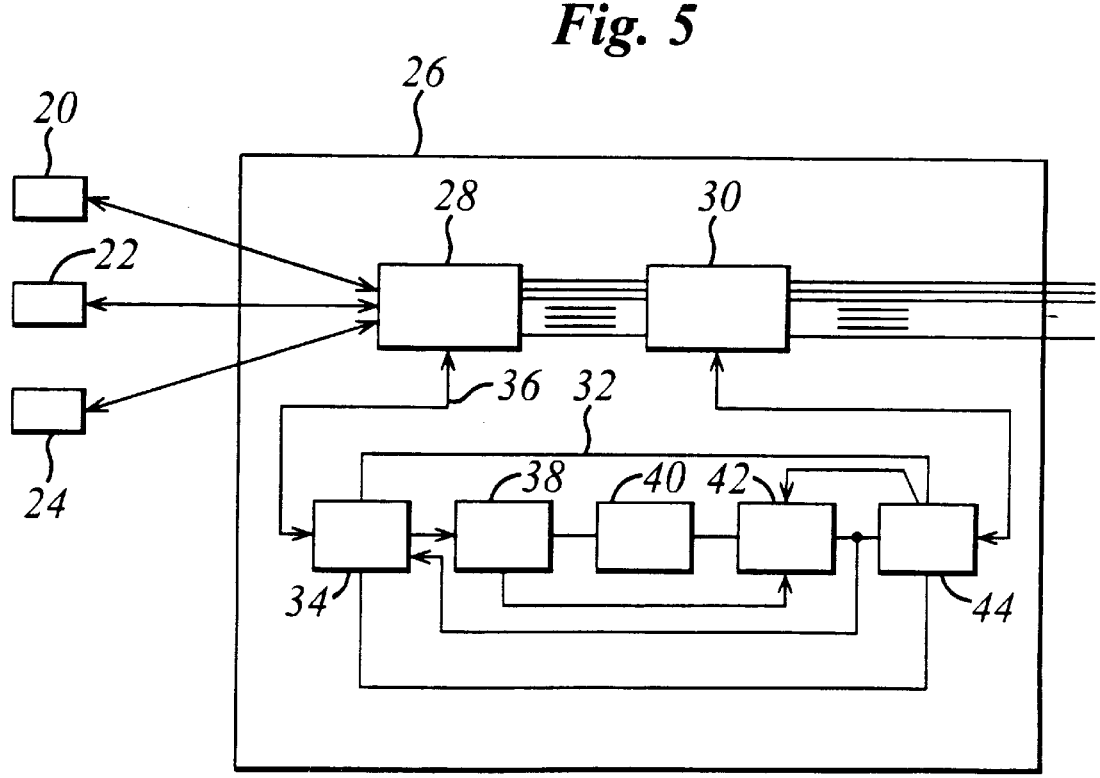
FIG. 5 is a block diagram of a radio resource allocation apparatus.

The block diagram of FIG. 5 shows a plurality of mobile radio stations 20, 22 and 24 connected by radio link to a base station or node 26. Within the base station, there is a transceiver (transmitter/receiver) 28 providing on the one hand a radio link to the mobile phone stations 20 to 24 and on the other hand a land line or radio link to another similar base station or node (not shown) via a channel switch 30. Both the transmitter/receiver 28 and the channel switch 30 operate bi-directionally, ie they feed signals in both directions.

The channel switch 30 is selectively operable to direct signals received from each incoming channel along a selected one of a plurality of outgoing channels under the control of a channel allocation device 32. The channel allocation device 32 is connected to the transmitter/receiver 28 to receive requests to transmit data from the dedicated control channels (not shown) existing between the mobile telephones 20 to 24 at the transmitter/ receiver 28. The channel allocation device 32 performs the algorithm defined by steps 1 to 5, as hereinbefore described. The channel allocation device 32 has a first port 34 which is coupled to the transceiver 28 via a bi-directional link 36.

A converter and sorter 38 are coupled to the port 34 to convert the QoS from each new request received in a data rate Rb(i) and bit energy to noise power ratio Eb/No and to sort the requests into one of two classes (class 1 and class 2).

The data from the converter and sorter 38 is then fed to a maximum load generator 40, which generates a maximum load parameter. A core calculator and assignor 42 receives the data ratio Rb(i), the bit energy to noise power ratio Eb/No and the classification signals from the converter 38, the maximum load parameter signals from the maximum load generator 40 as well as channel status signals received from the channel switch 30 via a second port 44 and operates the hereinbefore described algorithm. The results of the algorithms are then used to send channel section signals via the port 44 to operate the channel selection switch accordingly.

What is claimed is:

1. A radio resource allocation method for allocating radio resources for transmission of signals along one or more channels between two nodes comprising the step of monitoring the different requests for transmission of signals between said nodes, dividing the requests into two classes, a first class for real time requirements and a second class for non-real time requirements, extracting from each request a first parameter representing the data rate ($R_b$) requirement and a second parameter representing the bit energy to noise power ratio ($E_b/N_o$) requirement, prioritizing the requests in order based on a predetermined set of rules, and allocating available channels to meet the request in order of priority, wherein said rules specify the allocation of first class requests with a priority in a descending order of bit energy to noise power ratio values.

2. A method according to claim 1, wherein said rules specify a predetermined minimum resource allocation for second class requests.

3. A method according to claim 1, wherein the said rules specify the allocation of competing requests of equal bit energy to noise requirement ratios in order of time of arrival of the request.

4. A method according to claim 3, including the step of determining when the requested resource consumption exceeds the resource capacity and when excess is detected, negotiating the resource consumption.

5. A method according to claim 4, wherein the negotiating step involves allocating a resource with a decreased transmission rate for the newest request and if the decrease in data rate necessary to accommodate all requests is below the minimum data rate requirement of the newest requests, blocking the newest request from being allocated a resource.

6. Radio resource allocation apparatus for allocating radio resources for transmission of signals along a plurality of channels to and from a node, the node comprising a transmitter/receiver for transmitting and receiving signals to and from the node and a channel selection device for selecting the channels along which different signal transmissions are to be routed, and a channel allocation device for controlling the allocation of channels by the channel selection device, the channel allocation device comprising first means responsive to incoming signal transmissions passing through the node to produce a data rate signal, a bit energy to noise power ratio signal and a classification signal, second means responsive to the output of the first means to generate a maximum load parameter signal and third means responsive to an output from the channel selection device providing channel status indications and to the output of the first and second means to process the received signals in accordance with a predetermined algorithm and to feed the channel selection device with channel selection signals accordingly, wherein the first means classifies signal transmissions which are real time transmissions as a first class and signal transmissions which are not real time as a second class and the algorithm specifies allocation of first class signals with a priority in descending order of bit energy to noise power ratio values.

7. Apparatus according to claim 6, wherein the algorithm of the third means includes resolving the capacity equation $\alpha \text{current} - \alpha \text{new} \leq \alpha \text{max} = 100\% - \eta$, where $\alpha$current is the current load of node as given by the sum of the resource consumption of all services that are served by the node, $\alpha$new is the additional load capacity required of the node, $\alpha$max is the maximum load which the node is capable of and $\eta$ is a reserve safety factor, whereby if the capacity boundary of the equation is exceeded, the generation of said channel selection signals is inhibited and a resource consumption negotiation takes place following which the capacity equation is again resolved, when the boundaries imposed by the capacity equation are not exceeded, the channel selection signals are transmitted to the channel selection device.

8. Apparatus according to claim 6, wherein the algorithm of the third means provides a minimum accommodation of resources for the second class transmissions.

* * * * *